(12) United States Patent
Staffel et al.

(10) Patent No.: US 7,438,881 B2
(45) Date of Patent: Oct. 21, 2008

(54) ANTICORROSIVE PIGMENTS

(75) Inventors: Thomas Staffel, Grunstadt (DE); Wahl Friedrich, Mannheim (DE); Angelika Metz, Weinheim (DE)

(73) Assignee: BK Giulini GmbH, Ludwigshafen (DE)

( * ) Notice: Subject to any disclaimer, the term of this patent is extended or adjusted under 35 U.S.C. 154(b) by 0 days.

(21) Appl. No.: 11/520,787

(22) Filed: Sep. 14, 2006

(65) Prior Publication Data

US 2007/0272117 A1    Nov. 29, 2007

(51) Int. Cl.
*C01B 25/36* (2006.01)
*C09C 1/40* (2006.01)
*C09C 3/00* (2006.01)
*C09C 3/04* (2006.01)

(52) U.S. Cl. ............... 423/311; 106/14.05; 106/14.12; 106/14.21; 106/286.5; 106/287.17; 106/287.29; 106/401; 252/387

(58) Field of Classification Search ........... 106/14.12, 106/401, 14.05, 14.21, 286.5, 287.17, 287.29; 423/311; 252/387
See application file for complete search history.

(56) References Cited

U.S. PATENT DOCUMENTS

| | | | | |
|---|---|---|---|---|
| 3,650,683 | A * | 3/1972 | Hloch et al. | 423/305 |
| 4,542,001 | A * | 9/1985 | Iino et al. | 423/311 |
| 4,845,136 | A * | 7/1989 | Saito et al. | 523/451 |
| 4,943,604 | A * | 7/1990 | Okuri et al. | 523/428 |
| 6,784,236 | B2 * | 8/2004 | Sugita et al. | 524/378 |
| 6,838,506 | B2 * | 1/2005 | Nakao et al. | 524/436 |
| 2002/0148328 | A1 * | 10/2002 | Holz et al. | 75/528 |

FOREIGN PATENT DOCUMENTS

| | | |
|---|---|---|
| EP | 1 109 867 B2 | 6/1999 |
| EP | 1 029 901 B1 | 1/2000 |
| EP | 1 116 756 B1 | 12/2000 |
| JP | 51-6897 A * | 1/1976 |
| JP | 63-274608 A * | 11/1988 |
| JP | 1-261211 A * | 10/1989 |
| JP | 5-112754 A * | 5/1993 |
| JP | 8-302272 A * | 11/1996 |
| JP | 2002-307011 A * | 10/2002 |
| WO | WO 00/11089 | 3/2000 |

OTHER PUBLICATIONS

Material Safety Data Sheet "Aluminum Phosphate", Science Lab. com, pp. 1-6, no date.*
Nishihara, M. et al., "Studies on Anticorrosive Properties of Aluminum Triphosphate Pigments", *Polymers Paint Colour Journal*, Aug. 1984, vol. 174, No. 4125, p. 590-597.
Nakano, J. et al., "Part 4. Zinc Galvanised Steel: Corrosion Resistance to White Rust", *Macromol. Symp.*, Oct. 2, 1985, vol. 175, No. 4152, p. 704-706.
Kalenda, P. et al., "Efficiency of Anticorrosive Pigments Based on Modified Phosphates", *Macromol. Symp.*, (2002), vol. 187, p. 397-406, no month.

* cited by examiner

*Primary Examiner*—Anthony J Green
(74) *Attorney, Agent, or Firm*—Venable LLP; Keith G. Haddaway

(57) ABSTRACT

The invention submitted concerns anticorrosive pigments of aluminum orthophosphate, their application as anticorrosive pigments in coating agents, as well as a method for their manufacturing.

8 Claims, No Drawings

ANTICORROSIVE PIGMENTS

FIELD OF THE INVENTION

The subject invention is concerned with zinc-free anticorrosive pigments, their application in paints, varnishes, etc., as well as a method to manufacture them.

BACKGROUND

Corrosion protection pigments have been known for a long time. Used as additives in paints, varnishes, and other coating agents, they are supposed to prevent corrosion of treated metallic surfaces and, like rust converters, favorably eliminate already existing corrosion products. Naturally, they have to be compatible with the coating agent in this regard.

Three characteristic modes of action distinguish corrosion protection pigments.

Pigments producing a physical anticorrosive effect, such as micaceous iron ore, are chemically inert and are referred to as inactive and/or passive pigments whose mode of action is that they considerably extend the diffusion pathways for water, oxygen, and corrosion-enhancing ions and improve the subsurface adhesion of the coat or finishing.

Pigments producing a chemical anticorrosive effect, for example, zinc oxide, possess a certain solubility and are capable of stabilizing or maintaining certain pH values in the coating. Such pigments are referred to as being active. Their mode of action is based on interactions at the transition between pigment and subsurface, pigment and binder, as well as pigment and incorporated foreign ions. Here, redox reactions that create new protective compounds may occur. Due to saponification with the binder and/or neutralization of the acid decomposition products a specific pH value in the coat remains nearly constant. Corrosive ions are eliminated.

Pigments producing electrochemical anticorrosive effects function by passivating actions on the metal surfaces to be protected. These anticorrosive pigments are characterized by whether they are effective in the anodic or cathodic range. Pigments preventing the dissolution of metal by forming a protective layer are designated as being active in the anodic range. Pigments which exhibit high oxidation potential blocking the formation of oxidation products, such as rust in the case of iron, are designated as being active in the cathodic range.

The increasing significance of preventing corrosion and the knowledge of health and environmental risks associated with anticorrosive pigments containing lead and chrome have led to the further development of less toxic anticorrosive pigments on the basis of phosphates, particularly $Zn_3(PO_4)_2$, or if appropriate, $Zn_3(PO_4)_2$, in combination with $AlPO_4$, ZnO as well as molybdate-tungstenate and zirconate pigments, metallic zinc, organic pigments and pure barrier pigments such as micaceous iron ore.

The currently used zinc phosphates, however, are classified as toxic to fishes and various proposals for their substitution have already been made.

The application of polymeric phosphates as an inorganic anticorrosive layer has been described in O. Kusnierik, K. Barton, Farbe+Lack 11, 900-901 (1998). Aluminum polyphosphates are to be applied.

A publication series entitled "Studies on anticorrosive properties of aluminium triphosphate pigments" in the *Polymers Paint Colour Journal* is concerned with the efficacy of aluminum triphosphates as anticorrosive pigments. For example, Nishihara et al. 174, 590-597 (1984) upon comparing zinc chromates describe in Part 1 that alkyd resin coatings have the same or even superior anticorrosive properties. Part 4, J. Nakano et al. 175, 704-706 (1985) describes the effectiveness against the formation of white rust.

Other approaches attempt to enhance efficacies by a partial replacement of zinc, for example, see P. Kalenda et al. in: Macromol. Symp. 187, 397-406 (2002) and EP 1 116 756.

EP 1 109 867 reveals anticorrosive pigments from surface-coated solid state bodies in which $Mn_3(PO)_4$ and aluminum oxides and/or aluminum hydroxides are precipitated.

EP 1 029 901 refers to combinations of inorganic anticorrosive pigments in which one or several pigments, selected from phosphate, polyphosphate and metal oxide pigments, are precipitated together with $BaSO_4$.

None of the anticorrosive pigments described completely fulfill all requirements regarding efficacy, processability, health and environmental safety. There is still a need for useful anticorrosive pigments and the task to provide such pigments.

Surprisingly, it was now discovered that aluminum orthophosphate displays a very good property spectrum regarding all three requirements mentioned above.

The three-fold requirements are satisfied by an anticorrosive pigment consisting of aluminum orthophosphate.

DETAILED DESCRIPTION

Aluminum orthophosphate can be an amorphous aluminum orthophosphate, an orthorhombic aluminum orthophosphate, a mixture amorphous and orthorhombic aluminum orthophosphates at weight percentages ranging from 80 to 20 and 20 to 80, respectively; a mixture of amorphous, orthorhombic, and trigonal (berlinite) aluminum orthophosphates at weight percentages ranging from 10 to 20, 20 to 50, and 20 to 70, respectively, or a mixture of berlinite and orthorhombic aluminum orthophosphate. It is understood that the sum of the individual aluminum orthophosphate percentages must add up to 100 percent. Impurities and/or secondary constituents have not been considered, their relative amount may be 15 weight percentages at maximum, preferably 10 weight percentages at maximum, most preferentially 5 weight percentages at maximum.

Preferred aluminum orthophosphates are amorphous aluminum orthophosphate, mixtures of 60 to 40 wt. % amorphous and 40 to 60 wt. % orthorhombic aluminum orthophosphate, in particular, mixtures of amorphous and orthorhombic aluminum orthophosphate with about equal proportions, as well as mixtures of 20 to 50 wt. % berlinite and 80 to 50 wt. % orthorhombic aluminum orthophosphate, preferentially 20 to 40 wt. % berlinite and 80 to 60 wt. % orthorhombic aluminum orthophosphate. Most preferred is amorphous aluminum orthophosphate.

Aluminum orthophosphates of the tridymite type are not very useful.

At maximum, 1 wt. % water-soluble phosphates and less than 0.05% chloride and/or sulfates may be contained as secondary components. The loss due to heating typically amounts to approx. 1 to 20% the pH value of a 1% suspension is at about 6 to 7.5.

Aluminum orthophosphate according to invention does not essentially contain any aluminum polyphosphates, i.e. their proportion is below 3 wt. %, preferentially below 1 wt. %, and particularly below 0.1%.

Manufacturing of the anticorrosive pigments according to the invention proceeds in an actually known way of converting aluminum salts with phosphoric acid or phosphates, whereby the poorly soluble aluminum orthophosphate is precipitated and separated. For example, aluminum hydroxide can be converted using phosphoric acid, and aluminum sulfate using sodium phosphate. Subsequent drying and, if necessary, tempering and perhaps grinding down to the needed grain size may ensue.

Depending on the conditions prevailing upon conversion of aluminum salt and phosphoric acid or in the process of tempering, the aluminum orthophosphate used according to invention contains more or less large proportions of orthorhombic and trigonal aluminum orthophosphate and may be more or less crystalline.

The conversion may, for example, proceed with aluminum sulfate or aluminum hydroxide. It is possible to add, for example, carbonates such as sodium carbonate in order to adjust the pH value during precipitation. Aluminum orthophosphate precipitates and is filtered off, if required, after further dilution with water. Subsequent drying ensues, for example, by means of spray drying.

If desired, the dried product can be further processed by tempering at 500 to 800° C., preferentially at 600 to 700° C. Tempering normally results in less reactive products which maintain efficacy over a longer period of time. Tempering at high temperatures should be avoided as it has a negative influence on solubility.

If the grain size of the aluminum orthophosphate thus obtained is not fine enough already, grinding and/or sorting or sieving will ensue. The grain size should preferably be in the range of $D_{50}$ 1-15 µm and $D_{90}$ 1-30 µm, whereby $D_{90}$ lies above $D_{50}$. In particular, the conditions $D_{50} \leq 10$ µm and $D_{90} \leq 10$ µm should be fulfilled. It is also preferential if approximately 0.01% of the grains at maximum have a grain size of more than 32 µm. $D_{90}$ and $D_{50}$ are defined as follows:

$D_{50}$ and $D_{90}$ are values which characterize the particle size of the aluminumphosphate pigments according to the invention, as the pigment particles naturally have different grain sizes. The values are derived from a grain size distribution curve. The value $D_{50}$ means that 50% of the particles are smaller than 1-15 mm. The $D_{90}$ value indicates that 90% of the particles are smaller than 1-30 mm.

The packed density lies preferably in the range of 90 to 250 g/l, in case of amorphous aluminum orthophosphate preferably in the range of 90 to 120 g/l.

The anticorrosive pigment aluminum orthophosphate according to invention is suited to replace zinc phosphate in coating agents. It possesses good anticorrosive properties and can be applied in both foundations and top coats.

The composition of coating agents is actually known to the expert. The real formulas depend, among other criteria, upon the subsurface to be coated, the type of coating agent, the intended mode of application, etc. Aluminum orthophosphate is well compatible with most components which coating agents normally contain. Up to about 1 to 20 wt. % aluminum orthophosphate is typically worked into the coating agent. However, if a dilution is foreseen before application, higher percentages may be used, if necessary.

The following examples are intended to further illustrate the invention, however, without limiting it to the embodiments specifically described. All percentages reported refer to weights, if not indicated otherwise.

EXAMPLE 1

Manufacturing of Aluminum Orthophosphate

Phosphoric acid (583 g, 84%, 5.0 mol) is given into a receiver and heated up to approx. 80° C., then aluminum hydroxide (410 g, wet hydrate incl. 5% water, 5.0 mol) is swiftly added, whereby the reaction mixture heats up to approx. 120° C. 500 ml water are brought into the very viscous suspension created. The precipitating crystalline solid substance is aspirated through a paper filter (S&S No. 606 ø110 mm), washed with 65 ml water, and dried over night at 110 ° C. The same amounts phosphoric acid and aluminum hydroxide are then converted for the next batch as described. Dilution proceeds with the mother liquor received in the first batch, then once again filtered, washed and dried. Eight additional batches are produced by analogy to the first run, whereby the mother liquor obtained from the preceding batch is used for making dilutions.

A yield of 6719 g is obtained from all nine batches; this amount is equivalent to a yield of 95%.

EXAMPLE 2

Tempering of Aluminum Orthophosphate

Aluminum orthophosphate manufactured in accordance with Example 1 and an aluminum orthophosphate which is supplied under the name of B111 from BK Giulini Chemie GmbH, Germany, and composed of an aluminum orthophosphate which had been made by precipitating aluminum sulfate with phosphoric acid and sodium carbonate, are tempered. To this end, the aluminum orthophosphate is brought into a heat-resistant stainless-steel tube (DIN 1.4841) over a vibrating channel. The tube is situated at a descending angle of 80 mm/1600 mm inside a furnace heated up to 700° C. and rotated at a speed of 10 rotations per minute. The rotations lead the material through the heated zone and discharge it at the end of the tube. The throughput rate amounts to 0.8-1.3 kg/h.

EXAMPLE 3

Efficacy Test

Seven different anticorrosive pigments were worked into a standardized varnish and the varnish was then applied onto sheets of metal. Afterwards adhesion (DIN 53151), degree of blistering (DIN 53209), and subsurface migration (DIN 53167) were determined applying the salt-spray test, the condensation water test, and after wet storage.

TABLE 1

| Designation | Substance | Manufacturing/Supplier | Tempering | Oil absorption value |
|---|---|---|---|---|
| Wa 2894 | AlPO4, mixture 70% berlinite/30% orthorhombic | Example 1 | Example 2 | 53.75 |

TABLE 1-continued

| Designation | Substance | Manufacturing/Supplier | Tempering | Oil absorption value |
|---|---|---|---|---|
| Wa 2890 | AlPO4, mixture 50% orthorhombic 50% amorphous | BK111, BK Giulini Chemie GmbH | Example 2 | 95.05 |
| Wa 2880C | AlPO4, amorphous water-free | BK111, BK Giulini Chemie GmbH | Example 2 | 34.19 |
| Wa 2825 | AlPO4, 100% orthorhombic | BK111, BK Giulini Chemie GmbH | Convection oven 650° C., 2 h | 37.76 |
| Wa 2886 | B111, AlPO4, amorphous, water-containing | B111, BK Giulini Chemie GmbH | none | 113.09 |
| ZP 10 | Zinc phosphate | ZP 10, Heubach | | 30.00 |
| Wa 2901 | magnesium oxiaminophosphate | Pigmentan E, Pigmentan Ltd. | | 89.28 |

ZP10 and Wa 2901 are comparative examples in which, ZP 10 is a zinc phosphate and Wa 2901 a commercially available zinc-free substitute product. The determination of the oil absorption value proceeded according to ISO 787, Part 5.

As to the varnish, two formulas were used. In one, as is common procedure in the paint industry, the amount of pigment was substituted on the basis of an identical oil absorption value. As the oil absorption values of the pigments tested strongly differ, substitution, in the second formula, proceeded on the basis of identical pigment masses in the second formula.

Formula 1:

TABLE 1

Formulas of the stock varnish (batch approx. 500 g, pigments substituted according to oil absorption values).

| Raw Material | 1/1 (g) | 1/2 (g) | 1/3 (g) | 1/4 (g) | 1/5 (g) | 1/6 (g) | 1/7 (g) |
|---|---|---|---|---|---|---|---|
| 1 Beckopox EP 301, 75% in xylene | 137.49 | 151.65 | 152.12 | 141.87 | 153.28 | 146.75 | 152.90 |
| 2 xylene | 41.27 | 45.52 | 45.66 | 42.58 | 46.01 | 44.05 | 45.90 |
| 3 Dowanol PM | 35.39 | 39.03 | 39.15 | 36.51 | 39.45 | 37.77 | 39.35 |
| 4 Methyl isoamyl ketone | 8.70 | 9.60 | 9.63 | 8.98 | 9.70 | 9.29 | 9.68 |
| 5 Bentone 38.8% in xylene | 36.99 | 40.80 | 40.92 | 38.17 | 41.24 | 39.48 | 41.13 |
| 6 Anti Terra 204 | 2.90 | 3.20 | 3.21 | 2.99 | 3.23 | 3.10 | 3.23 |
| 7 Aerosil R 972 | 2.32 | 2.56 | 2.57 | 2.39 | 2.59 | 2.48 | 2.58 |
| 8 Finntalc M 15 | 73.09 | 80.62 | 80.87 | 75.42 | 81.49 | 78.02 | 81.29 |
| 9 EWO | 76.58 | 84.46 | 84.72 | 79.01 | 85.37 | 81.73 | 85.16 |
| 10 Finntitan 3-RD 2-3036 | 15.66 | 17.28 | 17.33 | 16.16 | 17.46 | 16.72 | 17.42 |
| 10 Zinc phosphate ZP 10 | 69.61 | | | | | | |
| 10 Wa 2901 | | 25.28 | | | | | |
| 10 Wa 2890 | | | 23.81 | | | | |
| 10 Wa 2825 | | | | 55.91 | | | |
| 10 Wa 2886 | | | | | 20.17 | | |
| 10 Wa 2894 | | | | | | 40.62 | |
| 10 Wa 2880C | | | | | | | 21.37 |
| 11 Furnace black 101 | 0.05 | 0.05 | 0.05 | 0.05 | 0.05 | 0.05 | 0.05 |
| Yield | 500 | 500 | 500 | 500 | 500 | 500 | 500 |

TABLE 2

Formulas of the stock varnish (batch approx. 500 g, pigments substituted according to mass values).

| | Raw Material | 1/1 (g) | 1/2 (g) | 1/3 (g) | 1/4 (g) | 1/5 (g) | 1/6 (g) | 1/7 (g) |
|---|---|---|---|---|---|---|---|---|
| 1 | Beckopox EP 301. 75% in xylene | 137.49 | 137.49 | 137.49 | 137.49 | 137.49 | 137.49 | 137.49 |
| 2 | Xylene | 41.27 | 41.27 | 41.27 | 41.27 | 41.27 | 41.27 | 41.27 |
| 3 | Dowanol PM | 35.39 | 35.39 | 35.39 | 35.39 | 35.39 | 35.39 | 35.39 |
| 4 | Methyl isoamyl ketone | 8.70 | 8.70 | 8.70 | 8.70 | 8.70 | 8.70 | 8.70 |
| 5 | Bentone 38.8% in xylene | 36.99 | 36.99 | 36.99 | 36.99 | 36.99 | 36.99 | 36.99 |
| 6 | Anti Terra 204 | 2.90 | 2.90 | 2.90 | 2.90 | 2.90 | 2.90 | 2.90 |
| 7 | Aerosil R 972 | 2.32 | 2.32 | 2.32 | 2.32 | 2.32 | 2.32 | 2.32 |
| 8 | Finntalc M 15 | 73.09 | 73.09 | 73.09 | 73.09 | 73.09 | 73.09 | 73.09 |
| 9 | EWO | 76.58 | 76.58 | 76.58 | 76.58 | 76.58 | 76.58 | 76.58 |
| 10 | Finntitan 3-RD 2-3036 | 15.66 | 15.66 | 15.66 | 15.66 | 15.66 | 15.66 | 15.66 |
| 10 | Zinc phosphate ZP 10 | 69.61 | | | | | | |
| 10 | Wa 2901 | | 69.61 | | | | | |
| 10 | Wa 2890 | | | 69.61 | | | | |
| 10 | Wa 2825 | | | | 69.61 | | | |
| 10 | Wa 2886 | | | | | 69.61 | | |
| 10 | Wa 2894 | | | | | | 69.61 | |
| 10 | Wa 2880C | | | | | | | 69.61 |
| 11 | Furnace black 101 | 0.05 | 0.05 | 0.05 | 0.05 | 0.05 | 0.05 | 0.05 |
| | Yield | 500 | 500 | 500 | 500 | 500 | 500 | 500 |

Manufacturing proceeded as follows: item 1 is given into a receptacle; addition of item 2 with incorporation under continual stirring; addition of item 6 under continual stirring, addition of portions of items 7-11 and stirring in using a spatula; pre-mixture of items 2-4 with addition under continual stirring (initially only as much solvent is added so that a viscosity is attained which is appropriate for dispersion, the rest is added after dispersal). Dispersion was done over 60 minutes at a rotation speed of 3300 rpm with 250 g glass beads under cooling.

For application, 500 g stock varnish were thoroughly mixed with 64 g hardener composed of 41.5 g Versamid and 22.5 g xylene. The ready-to-use varnish was diluted with a Xylene-Dowanol PM mixture (4:1) to attain spray viscosity (DIN beaker 4: 16-17 seconds).

Application onto metal sheets proceeded with the aid of high-pressure syringes equipped with a 1.3 mm-nozzle, at 4 bar pressure, to yield a coating thickness: 50±5. Formulations with an identical pigment mass revealed a marked change in flow properties of the stock varnish. The intended coating thickness could therefore not be reached in this test series. In each test, three metal sheets were coated in the wet storage test, salt-spray test, and condensation water test, respectively, in addition to one retention sample sheet. The following tests were conducted after conditioning the specimens in a climate chamber for over ten days:

a) salt-spray test (acc. to DIN 50021)
b) condensation water test (similar to DIN 50017)
c) wet storage (DIN 627/1)
d) adhesion test after 4 weeks (DIN 53151)
e) determination of the degree of blistering, weekly (DIN 53209)
f) determination of underrusting after 28 days (DIN 53167)

The results obtained in the adhesion test are compiled in Tables 3 and 4.

TABLE 3

Results of the adhesion tests (DIN 53151) (Series 1)

| | Sheet No. | | | | | | | |
|---|---|---|---|---|---|---|---|---|
| | 1/1/1 | 1/1/2 | 1/2 | 1/3 | 1/4 | 1/5 | 1/6 | 1/7 |
| | | | | Pigment Type | | | | |
| Adhesion | ZP 10 | ZP 10 | Wa 2901 | Wa 2890 | Wa 2825 | Wa 2886 | Wa 2894 | Wa 2880C |
| After Salt-Spray Test | | | | | | | | |
| 1 | 0 | 1 | 4 | 0 | 5 | 2 | 0 | 5 |
| 2 | 1 | 4 | 5* | 5* | 5 | 0 | 1 | 0 |
| 3 | 0 | 5* | 5 | 1 | 5 | 1 | 5* | 0 |

TABLE 3-continued

Results of the adhesion tests (DIN 53151) (Series 1)

| Adhesion | Sheet No. | | | | | | | |
|---|---|---|---|---|---|---|---|---|
| | 1/1/1 | 1/1/2 | 1/2 | 1/3 | 1/4 | 1/5 | 1/6 | 1/7 |
| | | | Pigment Type | | | | | |
| | ZP 10 | ZP 10 | Wa 2901 | Wa 2890 | Wa 2825 | Wa 2886 | Wa 2894 | Wa 2880C |
| After Condensation Water Test | | | | | | | | |
| 1 | 1 | 1 | 5* | 0 | 4 | 0 | 1 | 2 |
| 2 | 1 | 0 | 5* | 0 | 1 | 4 | 0 | 2 |
| 3 | 1 | 1 | 5** | 0 | 1 | 3 | 0 | 2 |
| after Wet Storage | | | | | | | | |
| 1 | 2 | 2 | 5* | 5* | 5* | 1 | 0 | 5 |
| 2 | 2 | 5 | 5* | 2 | 3 | 1 | 1 | 2 |
| 3 | 5* | 5** | 5** | 5* | 4 | 5** | 1 | 5* |

*complete detachment in the cutting section
**complete detachment exceeding the cutting section

TABLE 4

Results of the adhesion tests (DIN 53151) (Series 2, intended coating thickness not reached)

| Adhesion | Sheet No. | | | | | | | |
|---|---|---|---|---|---|---|---|---|
| | 1/1/1 | 1/1/2 | 2/2 | 2/3 | 2/4 | 2/5 | 2/6 | 2/7 |
| | | | Pigment Type | | | | | |
| | ZP 10 | ZP 10 | Wa 2901 | Wa 2890 | Wa 2825 | Wa 2886 | Wa 2894 | Wa 2880C |
| after Salt-Spray Test | | | | | | | | |
| 1 | 0 | 1 | 5* | 5* | 5 | 4 | 1 | 1 |
| 2 | 1 | 4 | 5 | 5** | 5* | 1 | 3 | 0 |
| 3 | 0 | 5* | 5* | 5 | 1 | 2 | 0 | 0 |
| After Condensation Water Test | | | | | | | | |
| 1 | 1 | 1 | 5* | 5 | 5* | 0 | 1 | 3 |
| 2 | 1 | 0 | 3 | 5** | 2 | 0 | 2 | 1 |
| 3 | 1 | 1 | 4 | 5 | 5** | 1 | 1 | 5* |
| after Wet Storage | | | | | | | | |
| 1 | 2 | 2 | 5** | 5 | 5 | 3 | 5 | 3 |
| 2 | 2 | 5 | 5** | 5** | 5* | 5* | 5 | 5** |
| 3 | 5* | 5** | 5** | 5** | 5* | 5 | 2 | 2* |

*complete detachment in the cutting section
**complete detachment exceeding the cutting section It can be conceived that the aluminum pigments according to invention display improved adhesion properties, however, at least an adhesion which is comparable to the reference pigment zinc phosphate (ZP 10). The zinc-free pigment used for reference produced less favorable results.

The results obtained from the test applied to determine the degree of blistering are compiled in Tables 5 and 6.

TABLE 5

Degree of blistering (DIN 53209) (Series 1)

| Sheet No. | 1/1/1 | | 1/1/2 | | 1/2 | | 1/3 | | 1/4 | | 1/5 | | 1/6 | | 1/7 | |
|---|---|---|---|---|---|---|---|---|---|---|---|---|---|---|---|---|
| Pigment Type | ZP 10 | | ZP 10 | | Wa 2901 | | Wa 2890 | | Wa 2825 | | Wa 2886 | | Wa 2894 | | Wa 2880C | |
| Degree of Blistering | m | g | m | g | m | g | m | g | m | g | m | g | m | g | m | g |
| after Salt-Spray Test | | | | | | | | | | | | | | | | |
| 7 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 14 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 21 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 28 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| After Condensation Water Test | | | | | | | | | | | | | | | | |
| 7 days | | | | | | | | | | | | | | | | |
| 1 | 0 | 0 | 0 | 0 | 0 | 0 | 0 | 0 | 1 | 1 | 0 | 0 | 0 | 0 | 0 | 0 |
| 2 | 0 | 0 | 0 | 0 | 2 | 2 | 0 | 0 | 1 | 1 | 0 | 0 | 0 | 0 | 0 | 0 |
| 3 | 0 | 0 | 0 | 0 | 1 | 1 | 0 | 0 | 0 | 0 | 0 | 0 | 0 | 0 | 0 | 0 |
| 14 days | | | | | | | | | | | | | | | | |
| 1 | 0 | 0 | 0 | 0 | 0 | 0 | 0 | 0 | 1 | 1 | 0 | 0 | 0 | 0 | 0 | 0 |
| 2 | 0 | 0 | 0 | 0 | 3 | 3 | 0 | 0 | 1 | 1 | 0 | 0 | 0 | 0 | 0 | 0 |
| 3 | 0 | 0 | 0 | 0 | 1 | 1 | 0 | 0 | 0 | 0 | 0 | 0 | 0 | 0 | 0 | 0 |
| 21 days | | | | | | | | | | | | | | | | |
| 1 | 0 | 0 | 0 | 0 | 4 | 1 | 0 | 0 | 1 | 1 | 0 | 0 | 0 | 0 | 1 | 1 |
| 2 | 0 | 0 | 0 | 0 | 3 | 4 | 0 | 0 | 1 | 2 | 0 | 0 | 0 | 0 | 1 | 1 |
| 3 | 0 | 0 | 0 | 0 | 1 | 1 | 0 | 0 | 0 | 0 | 0 | 0 | 0 | 0 | 1 | 1 |
| after Wet Storage Test | | | | | | | | | | | | | | | | |
| 7 days | | | | | | | | | | | | | | | | |
| 1 | 0 | 0 | 0 | 0 | 2 | 2 | 0 | 0 | 0 | 0 | 0 | 0 | 0 | 0 | 0 | 0 |
| 2 | 0 | 0 | 0 | 0 | 3 | 2 | 0 | 0 | 0 | 0 | 0 | 0 | 0 | 0 | 0 | 0 |
| 3 | 0 | 0 | 0 | 0 | 3 | 2 | 0 | 0 | 0 | 0 | 0 | 0 | 0 | 0 | 0 | 0 |
| 14 days | | | | | | | | | | | | | | | | |
| 1 | 0 | 0 | 0 | 0 | 3 | 4 | 0 | 0 | 0 | 0 | 0 | 0 | 0 | 0 | 0 | 0 |
| 2 | 0 | 0 | 1 | 1 | 3 | 2 | 0 | 0 | 0 | 0 | 0 | 0 | 0 | 0 | 0 | 0 |
| 3 | 0 | 0 | 1 | 1 | 3 | 4 | 0 | 0 | 0 | 0 | 0 | 0 | 0 | 0 | 0 | 0 |

TABLE 5-continued

Degree of blistering (DIN 53209) (Series 1)

| | Sheet No. | | | | | | | | | | | | | | |
|---|---|---|---|---|---|---|---|---|---|---|---|---|---|---|---|
| | 1/1/1 | | 1/1/2 | | 1/2 | | 1/3 | | 1/4 | | 1/5 | | 1/6 | | 1/7 |
| | Pigment Type | | | | | | | | | | | | | | |
| | ZP 10 | | ZP 10 | | Wa 2901 | | Wa 2890 | | Wa 2825 | | Wa 2886 | | Wa 2894 | | Wa 2880C |
| | Degree of Blistering | | | | | | | | | | | | | | |
| | m | g | m | g | m | g | m | g | m | g | m | g | m | g | m | g |
| 21 days | | | | | | | | | | | | | | | | |
| 1 | 0 | 0 | 0 | 0 | 3 | 4 | 0 | 0 | 0 | 0 | 0 | 0 | 0 | 0 | 0 | 0 |
| 2 | 0 | 0 | 2 | 1 | 3 | 2 | 0 | 0 | 0 | 0 | 0 | 0 | 0 | 0 | 0 | 0 |
| 3 | 0 | 0 | 1 | 1 | 3 | 4 | 0 | 0 | 0 | 0 | 0 | 0 | 0 | 0 | 0 | 0 |
| 28 days | | | | | | | | | | | | | | | | |
| 1 | 0 | 0 | 0 | 0 | 3 | 4 | 1 | 1 | 1 | 1 | 0 | 0 | 0 | 0 | 1 | 1 |
| 2 | 0 | 0 | 2 | 2 | 3 | 2 | 0 | 0 | 0 | 0 | 0 | 0 | 0 | 0 | 1 | 1 |
| 3 | 1 | 1 | 1 | 1 | 3 | 4 | 0 | 0 | 1 | 1 | 0 | 0 | 1 | 1 | 0 | 0 |

No differentiation concerning the degree of blistering was obtained in the salt-spray test even after 4 weeks. In the condensation water test, the sheets to which the foundations according to invention were applied, i.e. 1/3, 1/5 and 1/6, as well as zinc phosphate, also did not display any blistering. Intermediate values were obtained for the 1/4 and 1/7 foundations according to invention, whereas the alternative zinc-free foundation 1/2 produced insufficient results. In the wet storage test, only the metal sheets coated with the 1/5 foundation according to invention did not yet display any blistering after a period of four weeks.

Sheets coated with zinc phosphate and the 1/3, 1/6, and 1/7 foundations according to invention, which displayed very small blisters only after the fourth week, produced good results.

However, all metal sheets did equally well within the error margins of the test, except for the alternative zinc-free foundation 1/2.

TABLE 6

Degree of blistering (DIN 53209) (Series 2, intended coating thickness not reached)

| | Sheet No. | | | | | | | | | | | | | | |
|---|---|---|---|---|---|---|---|---|---|---|---|---|---|---|---|
| | 1/1/1 | | 1/1/2 | | 2/2 | | 2/3 | | 2/4 | | 2/5 | | 2/6 | | 2/7 |
| | Pigment Type | | | | | | | | | | | | | | |
| | ZP 10 | | ZP 10 | | Wa 2901 | | Wa 2890 | | Wa 2825 | | Wa 2886 | | Wa 2894 | | Wa 2880C |
| | Degree of Blistering | | | | | | | | | | | | | | |
| | m | g | m | g | m | g | m | g | m | g | m | g | m | g | m | g |
| after Salt-Spray Test 7 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 14 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 21 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 28 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |

TABLE 6-continued

Degree of blistering (DIN 53209) (Series 2, intended coating thickness not reached)

| Sheet No. | 1/1/1 | | 1/1/2 | | 2/2 | | 2/3 | | 2/4 | | 2/5 | | 2/6 | | 2/7 | |
|---|---|---|---|---|---|---|---|---|---|---|---|---|---|---|---|---|
| Pigment Type | ZP 10 | | ZP 10 | | Wa 2901 | | Wa 2890 | | Wa 2825 | | Wa 2886 | | Wa 2894 | | Wa 2880C | |
| Degree of Blistering | m | g | m | g | m | g | m | g | m | g | m | g | m | g | m | g |
| after Condensation Water Test 7 days | | | | | | | | | | | | | | | | |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 2 | 2 | 0 | 0 | 1 | 1 | 0 | 0 | 0 | 0 | 0 | 0 |
| 3 | 0 | 0 | 0 | 0 | 3 | 3 | 0 | 0 | 1 | 1 | 0 | 0 | 0 | 0 | 0 | 0 |
| 14 days | | | | | | | | | | | | | | | | |
| 1 | 0 | 0 | 0 | 0 | 3 | 3 | 0 | 0 | 2 | 1 | 0 | 0 | 0 | 0 | 0 | 0 |
| 2 | 0 | 0 | 0 | 0 | 2 | 2 | 0 | 0 | 2 | 1 | 0 | 0 | 0 | 0 | 0 | 0 |
| 3 | 0 | 0 | 0 | 0 | 3 | 3 | 0 | 0 | 3 | 2 | 0 | 0 | 0 | 0 | 0 | 0 |
| 21 days | | | | | | | | | | | | | | | | |
| 1 | 0 | 0 | 0 | 0 | 3 | 3 | 1 | 1 | 3 | 3 | 0 | 0 | 0 | 0 | 0 | 0 |
| 2 | 0 | 0 | 0 | 0 | 2 | 2 | 2 | 2 | 4 | 3 | 0 | 0 | 0 | 0 | 0 | 0 |
| 3 | 0 | 0 | 0 | 0 | 3 | 3 | 1 | 1 | 3 | 4 | 0 | 0 | 0 | 0 | 0 | 0 |
| after Wet Storage Test 7 days | | | | | | | | | | | | | | | | |
| 1 | 0 | 0 | 0 | 0 | 4 | 4 | 0 | 0 | 0 | 0 | 0 | 0 | 0 | 0 | 0 | 0 |
| 2 | 0 | 0 | 0 | 0 | 4 | 4 | 0 | 0 | 0 | 0 | 0 | 0 | 0 | 0 | 0 | 0 |
| 3 | 0 | 0 | 0 | 0 | 4 | 4 | 0 | 0 | 0 | 0 | 0 | 0 | 0 | 0 | 0 | 0 |
| 14 days | | | | | | | | | | | | | | | | |
| 1 | 0 | 0 | 0 | 0 | 5 | 4 | 0 | 0 | 0 | 0 | 0 | 0 | 0 | 0 | 0 | 0 |
| 2 | 0 | 0 | 1 | 1 | 4 | 4 | 1 | 1 | 0 | 0 | 0 | 0 | 0 | 0 | 0 | 0 |
| 3 | 0 | 0 | 1 | 1 | 4 | 4 | 1 | 1 | 0 | 0 | 0 | 0 | 0 | 0 | 0 | 0 |
| 21 days | | | | | | | | | | | | | | | | |
| 1 | 0 | 0 | 0 | 0 | 5 | 4 | 3 | 2 | 0 | 0 | 0 | 0 | 0 | 0 | 0 | 0 |
| 2 | 0 | 0 | 2 | 1 | 4 | 4 | 1 | 1 | 0 | 0 | 0 | 0 | 0 | 0 | 0 | 0 |
| 3 | 0 | 0 | 1 | 1 | 4 | 4 | 0 | 0 | 0 | 0 | 0 | 0 | 0 | 0 | 0 | 0 |
| 28 days | | | | | | | | | | | | | | | | |
| 1 | 0 | 0 | 0 | 0 | 5 | 4 | 3 | 2 | 1 | 1 | 1 | 1 | 1 | 1 | 0 | 0 |
| 2 | 0 | 0 | 2 | 2 | 5 | 4 | 1 | 1 | 0 | 0 | 1 | 1 | 0 | 0 | 1 | 1 |
| 3 | 1 | 1 | 1 | 1 | 4 | 4 | 0 | 0 | 1 | 1 | 1 | 1 | 0 | 0 | 0 | 0 |

As a tendency, metal sheets coated with foundations of the second series confirmed the results of the first. Despite the lower coating thickness, all foundations according to invention produced equally good results as zinc phosphate within the error margins of the test, with the exception of 1/3. The alternative zinc-free foundation again produced insufficient.

The results of the subsurface migration test are compiled in Tables 7 and 8.

TABLE 7

Subsurface migration according to DIN 53167 (Series 1)

| | Foundation No. | | | | | | |
|---|---|---|---|---|---|---|---|
| 1/1/1 | 1/1/2 | 1/2 | 1/3 | 1/4 | 1/5 | 1/6 | 1/7 |
| | | | Pigment Type | | | | |
| ZP 10 | ZP 10 | Wa 2901 | Wa 2890 | Wa 2825 | Wa 2886 | Wa 2894 | Wa 2880C |

| | | | | | | | |
|---|---|---|---|---|---|---|---|
| after Salt-Spray Test 28 days | 5.6 | 16.6 | 6.4 | 5.1 | 5.1 | 2.9 | 5.4 | 4.8 |

The least migration was found on the metal sheet coated with the 1/5 foundation according to invention. The subsurface migration values obtained from other sheets ranging between 4.8 and 6.4 were very close to each other, in the order of foundation 1/7, 1/3 and 1/4, 1/6 and reference 1/1/1. The second reference foundation 1/1/2 made an exception.

TABLE 8

Subsurface migration according to DIN 53167 (Series 2, intended coating thickness not reached)

| | Foundation No. | | | | | | |
|---|---|---|---|---|---|---|---|
| 1/1/1 | 1/1/2 | 2/2 | 2/3 | 2/4 | 2/5 | 2/6 | 2/7 |
| | | | Pigment Type | | | | |
| ZP 10 | ZP 10 | Wa 2901 | Wa 2890 | Wa 2825 | Wa 2886 | Wa 2894 | Wa 2880C |

| | | | | | | | |
|---|---|---|---|---|---|---|---|
| after Salt-Spray Test 28 days | 5.6 | 16.6 | 1 | 1.3 | 3 | 1 | 4.9 | 0.8 |

The metal sheets coated with the foundations of the second series possessing the least coating thickness, sheets coated with the foundations 2/2, 2/3, 2/5 and 2/7 displayed very little migration. Subsurface migration on the sheet with the foundations 2/4 and 2/6 was somewhat better than on the sheet to which the zinc phosphate foundation had been applied.

In summary, the tests demonstrated that the efficacy of aluminum orthophosphate as an anticorrosive pigment is comparable with zinc phosphate which is currently in use. A hitherto available, alternative zinc-free pigment, Pigmentan E, displayed a markedly poorer efficacy.

What is claimed is:

1. A method of manufacturing an anticorrosive pigment for a zinc-free coating composition comprising an anticorrosive pigment wherein the anticorrosive pigment consists of aluminum orthophosphate, the method comprising the steps:
    a) converting an aluminum salt with phosphoric acid or a phosphate in the aqueous phase; and
    b) precipitation of aluminum orthophosphate
    c) filtration of aluminum orthophosphate; and
    d) drying of aluminum orthophosphate,
    e) tempering said orthophosphate at a temperature ranging from 500 to 800° C.; and
    f) grinding said aluminum orthophosphate, in one step, to a grain size of $D_{50} \leq 15$ µm and $D_{90} \leq 30$ µm.

2. The method of claim 1, wherein aluminum orthophosphate is selected from the group consisting of amorphous aluminum orthophosphate; orthorhombic aluminum orthophosphate; a mixture of orthorhombic aluminum orthophosphate and amorphous aluminum orthophosphate; and a mixture of orthorhombic, trigonal and amorphous aluminum orthophosphate.

3. The method of claim 1, wherein aluminum orthophosphate is selected from the group consisting of 100 wt. % amorphous aluminum orthophosphate; a mixture of 20 to 80 wt. % amorphous and 80 to 20 wt. % orthorhombic aluminum orthophosphate; and a mixture of 20 to 50 wt. % orthorhombic, 20 to 70 wt. % trigonal, and 10 to 20 wt. % amorphous aluminum orthophosphate.

4. A method in accordance with claim 1, wherein the aluminum salt is aluminum hydroxide and is chemically converted with phosphoric acid.

5. A method in accordance with claim 1, wherein drying proceeds by spray drying.

6. A method of manufacturing an anticorrosive pigment for a zinc-free coating composition, comprising the steps:
    a) converting an aluminum salt with phosphoric acid or a phosphate in the aqueous phase; and
    b) precipitation of aluminum orthophosphate
    c) filtration of aluminum orthophosphate; and
    d) drying of aluminum orthophosphate, e) tempering said orthophosphate at a temperature ranging from 500 to 800° C.; and f) grinding said aluminum orthophosphate, in one step, to a grain size of $D_{50} \leqq 15$ μm and $D_{90} \leqq 30$ μm, wherein the aluminum salt is an aluminum sulfate and is converted with sodium phosphate.

7. A zinc-free coating composition comprising an anticorrosive pigment wherein the anticorrosive pigment consists of aluminum orthophosphate, wherein aluminum orthophosphate is characterized by a grain size range of from $D_{50}$ 1-15 μm to $D_{90}$ 1-30 μm and wherein the aluminum orthophosphate possesses a packed density of 90-250 μg/l.

8. The coating composition of claim 7, wherein aluminum orthophosphate is selected from the group consisting of 100 wt. % amorphous aluminum orthophosphate; a mixture of 20 to 80 wt. % amorphous and 80 to 20 wt. % orthorhombic aluminum orthophosphate; and a mixture of 20 to 50 wt. % orthorhombic, 20 to 70 wt. % trigonal, and 10 to 20 wt. % amorphous aluminum orthophosphate.

\* \* \* \* \*